United States Patent [19]

Rowley

[11] Patent Number: 5,999,740
[45] Date of Patent: Dec. 7, 1999

[54] UPDATING MECHANISM FOR SOFTWARE

[75] Inventor: David John Rowley, Warrington, United Kingdom

[73] Assignee: International Computers Limited, Cavendish, United Kingdom

[21] Appl. No.: 08/939,526

[22] Filed: Sep. 29, 1997

[30] Foreign Application Priority Data

Nov. 8, 1996 [GB] United Kingdom .................. 9623298

[51] Int. Cl.$^6$ ...................................... G06F 9/44
[52] U.S. Cl. ..................... 395/712; 709/221; 709/223
[58] Field of Search ........................ 395/703, 712, 395/200.5, 200.51, 200.53, 200.52, 200.54, 200.33, 200.47, 200.48, 200.49; 705/26; 707/200, 203; 709/203, 216–223

[56] References Cited

U.S. PATENT DOCUMENTS

| 5,473,772 | 12/1995 | Halliwell et al. ........................ 395/712 |
| 5,752,042 | 5/1998 | Cole et al. ............................... 395/712 |
| 5,761,649 | 6/1998 | Hill .......................................... 705/27 |
| 5,764,992 | 6/1998 | Kullick et al. ........................... 395/712 |
| 5,809,251 | 9/1998 | May et al. ........................... 395/200.53 |
| 5,809,287 | 9/1998 | Stupek, Jr. et al. ..................... 395/500 |
| 5,815,722 | 9/1998 | Kalwitz et al. .......................... 395/712 |
| 5,845,077 | 12/1998 | Fawcett ............................... 395/200.51 |
| 5,857,107 | 1/1999 | Tsuchida ................................. 395/712 |
| 5,859,969 | 1/1999 | Oki et al. ............................. 395/200.3 |
| 5,867,714 | 2/1999 | Todd et al. .............................. 395/712 |

OTHER PUBLICATIONS

Symborski, "Updating Software and configuration data in a distributed communication network", Proceedings of the Computer Networking Symposium, IEEE, 1998, pp. 331–338.

Gumbold, "Software distribution by reliable multicast", Proc. 21st IEEE conference on LOcal COmputer Networks, 1996, pp. 222–231.

Johnson, "Software Updating Eased—Microsoft initiative designed to simplify and automate tasks", Informationweek, Dec. 1996, pp. 1–3.

*Primary Examiner*—Tariq R. Hafiz
*Assistant Examiner*—Kakali Chaki
*Attorney, Agent, or Firm*—Lee, Mann, Smith, McWilliams, Sweeney and Ohlson

[57] ABSTRACT

A computer has a memory storing a number of software applications, and a registration file, indicating which application versions are currently installed in the memory. A software update mechanism in the computer accesses a remote file server to obtain a release file containing a list of software applications available from the remote server, and compares the release file with the registration file to determine which of the installed applications have upgrades available. When a user selects an application for upgrading, and the update mechanism accesses the remote file server to obtain a manifest file containing details of the application files required to form an updated version of this applications. The manifest file is used to determine which of the required application files are already available in the computer; and only those application files that are not already available in the computer are accessed and installed in the memory.

20 Claims, 7 Drawing Sheets

Edit Release Details

Title:
Build Expert Infrastructure

DependsUpon:

UserNames:

DisplayAsDate:           Status:
No

[OK]  [Select Target Servers]  [Help]

FIG. 6

Select Target Servers

New Target Server:                                    FT Type:
isnt07.wg.icl.co.uk                                   ftp Username:                          Password:
isupload                           15update Target Servers:
ftp://isnt07.wg.icl.co.uk, username = isupload, password = 15update

[Add Target] [Defaults] [Delete Target] [OK] [Help]

FIG. 7

| FileName | Version | Target directory | Date and Time | Flags | File Size | CRC | Compressed | Win Version |
|---|---|---|---|---|---|---|---|---|
| caingress.sic | 96.0115 | Application Dir | 06/11/1995 16:43:14 | | 82261 | 1e40af3e | 48572 | |
| cobol.sic | 96.0501 | Application Dir | 19/04/1996 15:01:04 | | 173786 | eac9dde4 | 100402 | |
| comms1.sic | 96.0501 | Application Dir | 22/04/1996 13:49:34 | | 213330 | e84a5cf9 | 131134 | |
| consoles.sic | 96.0501 | Application Dir | 22/04/1996 11:00:56 | | 135002 | ecb0ad3d | 79001 | |
| finalrpt.ctl | 95.0703 | Application Dir | 03/07/1995 11:50:52 | | 1675 | a591ea63 | 1020 | |
| info.sic | 96.0115 | Application Dir | 28/11/1995 11:12:12 | | 226207 | 12490fd5 | 130251 | |
| infcd.sic | 95.0523 | Application Dir | | | 0 | | 0 | |
| informix.sic | 96.0115 | Application Dir | 27/11/1995 14:41:36 | | 583981 | 911ce9df | 332719 | |
| ingres.sic | 95.0515 | Application Dir | 19/04/1995 09:56:42 | | 0 | | 0 | |
| isee.sic | 95.1113 | Application Dir | 27/10/1995 11:30:50 | | 133226 | 2cd4c4fb | 78008 | |
| mfgssks.sic | 96.0215 | Application Dir | 09/02/1996 13:39:08 | | 601809 | 6b560733 | 342016 | |
| mfgtshs.sic | 96.0215 | Application Dir | 09/02/1996 11:58:36 | | 484010 | 347c994d | 276057 | |
| netware.sic | 96.0501 | Application Dir | 22/04/1996 10:39:42 | | 46703 | 9601ee29 | 28012 | |
| novell.sic | 96.0501 | Application Dir | 18/04/1996 13:04:44 | | 180390 | cb44eeed | 102593 | |
| nx.sic | 96.0501 | Application Dir | 22/04/1996 09:50:48 | | 527948 | 8649469f | 331160 | |
| opclt.sic | 96.0501 | Application Dir | 22/04/1996 09:34:18 | | 120348 | 1ff44594 | 72897 | |
| opsrv.sic | 96.0501 | Application Dir | 01/04/1996 13:33:24 | | 330704 | deb2da6e | 189856 | |
| opxtra.sic | 96.0501 | Application Dir | 01/04/1996 13:34:06 | | 449352 | d0c1524c | 265071 | |
| pcuniv.sic | 96.0501 | Application Dir | 16/04/1996 16:37:50 | | 64315 | 6ba6fa4e | 39591 | |
| prosys.sic | 96.0401 | Application Dir | 17/01/1996 12:51:56 | R | 127308 | 8b4ca254 | 75176 | |
| sco.sic | 96.0501 | Application Dir | 22/04/1996 12:15:34 | | 79564 | 60ce16f | 48523 | |

Release 96.0502 of EXEC-TEAM

Row loaded count: 22 (last row 21)

FIG. 8

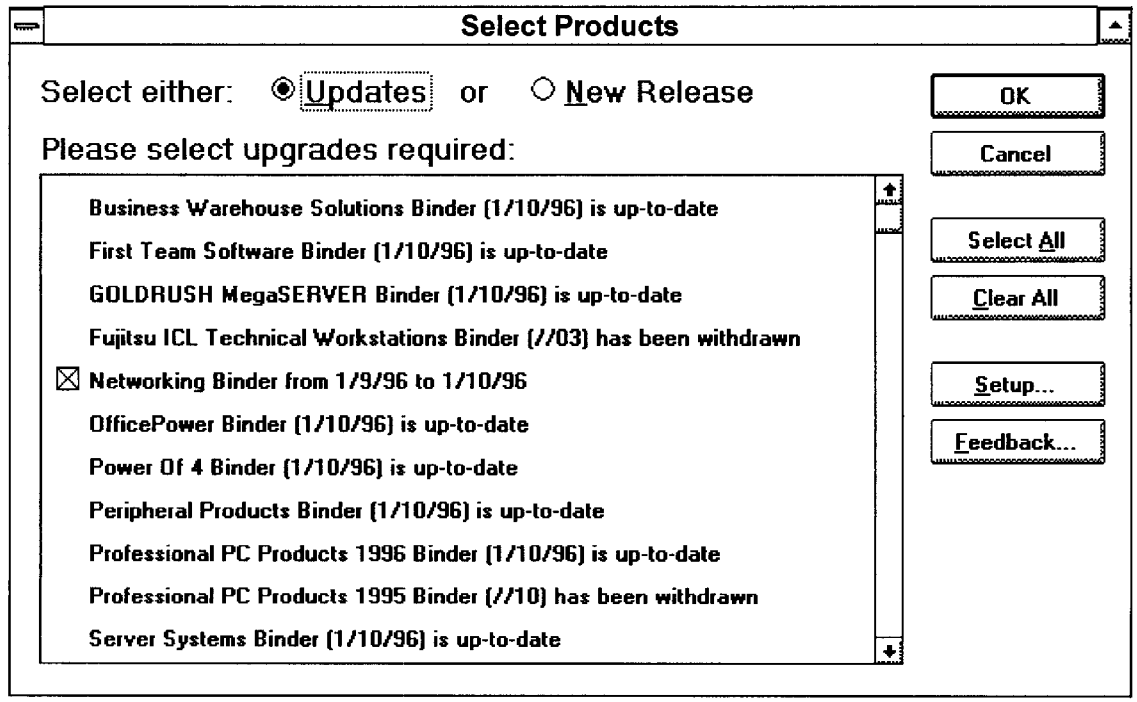

FIG. 9

UPDATING MECHANISM FOR SOFTWARE

BACKGROUND OF THE INVENTION

This invention relates to an updating mechanism for software applications.

The invention is concerned with the problem of updating a number of software applications installed in a number of client computers. Conventionally, this is done by distributing the update information on media such as floppy disks or CD-ROMs. It is also possible for users to download required updates over a network from a file server, for example using a standard file transfer protocol such as ftp.

Problems with these existing methods of updating software applications are that they are inconvenient for the user, requiring the user to perform actions to obtain the necessary update information and to install it on the user's computer, and that the administrative function does not know whether the update has been done. The object of the present invention is to provide a more convenient and user-friendly mechanism for performing updates.

SUMMARY OF THE INVENTION

According to the invention a computer comprises a memory storing a plurality of software applications and storing a registration file, indicating which applications are currently installed in said memory and their version details, the computer also including a software update mechanism comprising:

(a) means for accessing a remote file server to obtain a release file containing a list of software applications available from the remote server and their current version details;

(b) means for comparing said release file with said registration file to determine which of the installed applications have upgrades available;

(c) user interface means for allowing a user to select at least one of said applications for upgrading;

(d) means for accessing the remote file server to obtain a manifest file containing details of the application files required to form an updated version of the selected application;

(e) means for using the manifest file to determine which of said application files are already available in the computer; and (f) means for accessing the remote file server to retrieve those application files that are not already available in the computer, and installing those files in the memory.

BRIEF DESCRIPTION OF THE DRAWINGS

FIGS. 4 to 8 show screen displays used by the uploader program.

FIG. 9 shows a screen display used by the update program.

DESCRIPTION OF AN EMBODIMENT OF THE INVENTION

One embodiment of the invention will now be described by way of example with reference to the accompanying drawings.

Figure 1:
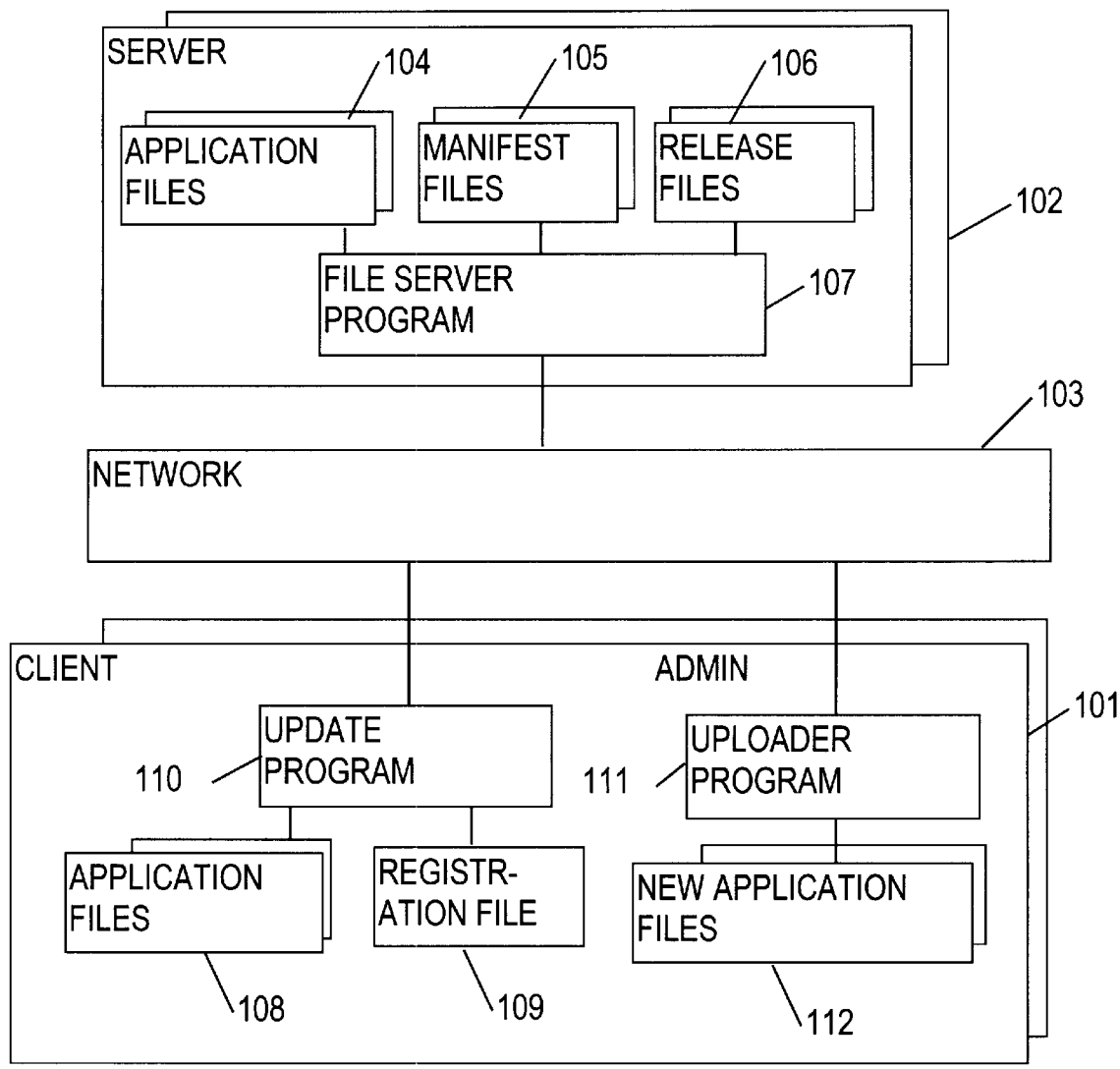
FIG. 1 is a block diagram of a computer network, including a number of clients and servers.

FIG. 1 shows a computer network comprising a number of client computers 101 and a number of server computers 102, interconnected by a network 103. The computers 101, 102 may for example be standard personal computers (PCs) running under the Microsoft Windows operating system. The network 103 may employ a conventional transport protocol, such as TCP/IP.

Each file server 102 stores a number of application files 104, forming a number of software applications. Normally, each application consists of several application files. The application files are stored in compressed form, using any standard data compression technique.

Conveniently, the server has a number of application directories, one for each application. Each of these directories has a number of sub-directories, which hold the new or amended application files for different versions of the application. Typically, one of these versions is an installer version of the application, while the other versions are non-installers. An installer is an executable program which, when run on a client machine, sets up the correct environment for the application. Normally, the first release of an application is an installer, and subsequent releases are non-installers.

Each file server also stores a number of manifest files 105, one for each version of each application stored on the server. These manifest files are stored in the relevant sub-directories, and each has a name constructed from the name and release number of the application to which it relates. Each manifest file contains a list of the application files that make up the particular version of the application. For each application file, it contains the following parameters:

The filename of the application file.

The version number of the application file.

The target directory into which the application file should be installed.

Date and time of issue.

File size and compressed file size.

An action parameter which indicates whether the file is to be installed, to be deleted, or to be executed on download.

A flag which indicates access permissions of the file, e.g. read only.

A cyclic redundancy checksum (CRC).

Additionally, each server stores one or two release files 106 containing a list of all the applications available on the server. For each application, a release file contains the following parameters:

The name of the application, i.e. a short identifying name for the application.

The version number of the application.

The application title, i.e. an identifier by which it is known to the user. (Note that the application title is distinct from the application name).

A parameter which specifies a linkage between this application and another application, such that any upgrade to this application will automatically cause the other application to be upgraded.

A list of user names indicating which users are permitted to download the application. If no user names are specified, any user is permitted to download the application.

A parameter which specifies whether the version number should be displayed to the user as a date.

The status of the application.

A release file may be in one of two states: live or deferred. When the release file is in the live state, it is visible to the software updating mechanism; otherwise it is invisible. At any point in time on a server, there will be either:
(a) one live release file and no (i.e. an empty) deferred release file; or
(b) one live release file and one deferred release file.

Each server computer includes a standard file server program 107, which can supply (to the update program) or receive (from the uploader program) files over the network on request to or from any of the client computers, using a standard file transfer protocol such as ftp.

Each of the client computers 101 stores a number of software applications, each consisting of a number of application files 108. Each client also stores a registration file 109 containing a list of all the applications currently installed on the client which are to be maintained by a software updating mechanism. For each application, the registration file contains the following parameters:
The application name.
The latest version number installed on the client.
The application title.
The directory in which the application is installed.

In general, the applications currently installed on any given client will be a subset of the applications available on the servers, and may not be the most up-to-date versions of those applications.

Each client computer includes an update program 110, which provides a mechanism for updating the software applications installed on that computer, and for installing new applications if required.

The system also includes an uploader program 111, which provides a mechanism for uploading a new or updated version of an application onto the servers. In FIG. 1, the uploader program 111 is shown as resident on one of the client computers 101. Alternatively, the uploader may reside on a different computer, such as one of the servers, or on a separate system administration computer. The new or updated application comprises a set of new application files 112, accessible to the computer in which the uploader resides.

Uploader Program

Figure 2:
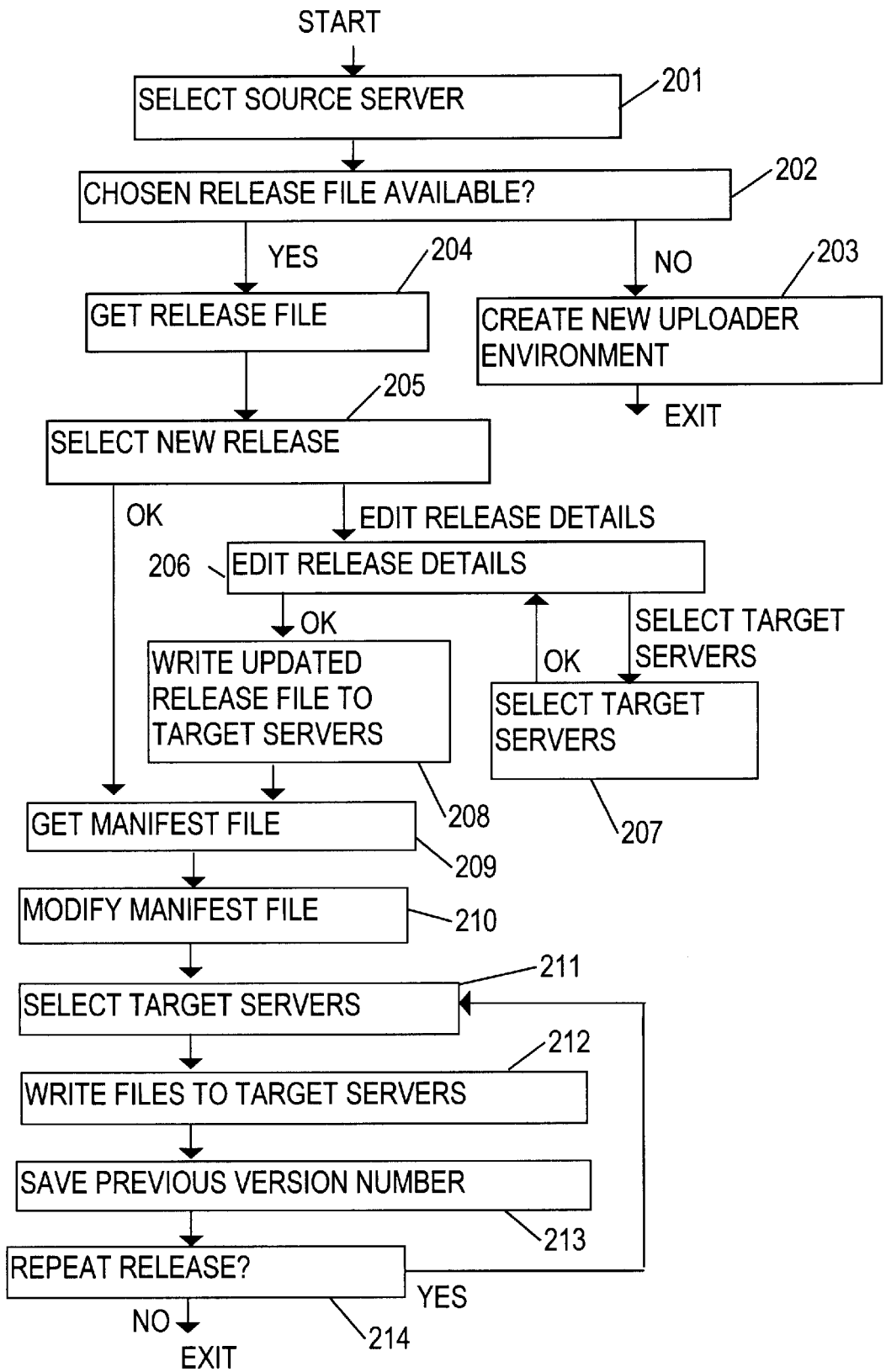
FIG. 2 is a flow chart of an uploader program.

FIG. 2 shows the operation of the uploader program 111. This program is used by a system administrator when it is desired to upload a new or updated version of a software application onto the servers. The uploader is conveniently a Microsoft Windows program.

Figure 4:
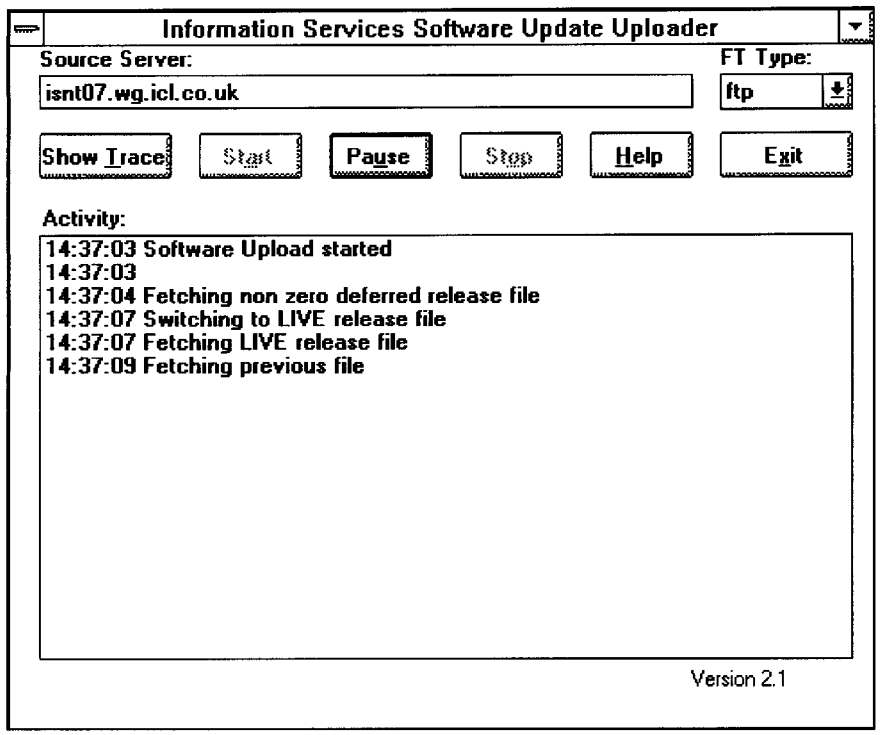

(Step 201) The uploader first displays a main screen, as shown in FIG. 4, which allows the administrator to specify which of the servers 102 is to act as a source server for obtaining a release file. The administrator can also specify the file transfer protocol to be used, for example ftp. This main screen is displayed throughout the uploader session, and plots the progress of the session.

The administrator can also specify, by way of message boxes, whether the new or updated application is an installer or a non-installer, and whether a deferred or live release file is to be used as a source. Of course, the second question is only asked if there is a non-empty deferred release file in existence at that time. If not, then the live release file is used as source by default. When a release file is made live, the deferred release file is emptied, i.e. it effectively does not exist.

(Step 202) Selecting the "Start" button from the main screen causes the uploader to contact the specified source server and to check whether the chosen release file is available.

(Step 203) If the chosen release file is not available, the uploader asks if a new uploader environment is to be created in the source server. If so, it then sets up a new skeleton directory structure and empty release files (live and deferred), and then exits.

(Step 204) Assuming that the chosen release file is available, the uploader fetches this file from the source server.

Figure 5:
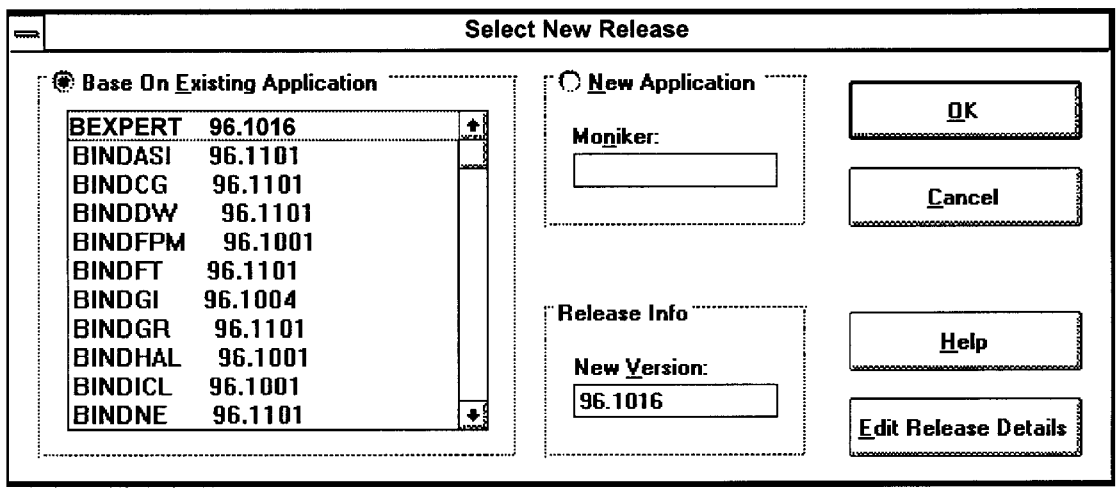

(Step 205) The uploader then displays a "Select New Release" screen, as shown in FIG. 5. This screen allows the administrator to select either a "Base on Existing Application" option or a "New Application" option.

If the "Base on Existing Application" option is selected, the uploader displays a list of the existing software applications, along with their version numbers, derived from the chosen release file. The administrator can then select one of these existing applications and enter a new version number. If the "New Application" option is selected, the administrator can enter a new name ("Moniker") and a version number for the new application.

If an "Edit Release Details" button is selected, the uploader proceeds to Step 206 below. If an "OK" button is selected, the uploader proceeds to Step 209.

(Step 206) If the "Edit Release Details" button is selected, the uploader displays a screen as shown in FIG. 6, which allows the administrator to update an entry in the release file, or to create a new entry. This screen includes the following text input boxes:
"Title"—the application title.
"DependsUpon"—this specifies a linkage between this application and another application.
"UserName"—a list of user names indicating which users are permitted to download the application.
"DisplayAsDate"—a parameter specifying whether the version number should be displayed to the user as a date.
"Status"—the status of the application.

Selection of a "Select Target Servers" button causes the uploader to proceed to Step 207 below. Selection of an "OK" button causes the uploader to proceed to Step 208, provided that at least one target server has been selected; if not it displays a warning message that no target server has been selected.

(Step 207) If the "Select Target Servers" button is selected, the uploader displays a screen as shown in FIG. 7, which allows the administrator to select one or more servers as target servers, to receive the updated release file. Selecting the "OK" button on this screen causes the uploader to return to Step 206.

(Step 208) The uploader writes the updated release file to each of the selected target servers for an existing application. This allows a system administrator to only update these release fields on the servers without going through a full uploader session or even creating a new release version of the application. However, for a new application, the uploader does not update the release file with the new release fields and write it to the servers until an actual release exists on the servers at step 212.

(Step 209) The uploader contacts the source server to obtain the manifest file for the selected application.

(Step 210) The uploader then displays a screen as shown in FIG. 8, showing the contents of the manifest file. This file can then be edited by the administrator, so as to create a new manifest file for the new or updated application. This may involve, for example, adding new directories or files, removing files, marking existing files for deletion on download, marking files for execution on download, and editing other file details (e.g. marking the file read only). This is done through menu commands.

(Step 211) The uploader can then display a screen as shown in FIG. 7 through a menu command if not done at step 207, allowing the administrator to select one or more servers as target servers, or to modify any existing selection done at step 207.

(Step 212) By choosing the appropriate menu command, the system administrator can then cause the uploader to write the updated release file, the new manifest file and all the new application files 112 to each of the selected target servers. The updated release file may be written in either a deferred or live state. If it is written in the live state, then any existing deferred release file is emptied.

Optionally, the updated release file may be sorted into a user-defined order before it is written (which is the order displayed in FIG. 9). Also optionally, the uploader may tidy the filestore on each target server after performing the writes.

(Step 213) The uploader also saves the previous version number of the application and, optionally, prints out the release files.

(Step 214) The uploader then asks the administrator whether the release is to be repeated to new or failed servers. If so, the uploader returns to Step 211; otherwise it exits.

Update Program

Figure 3A:
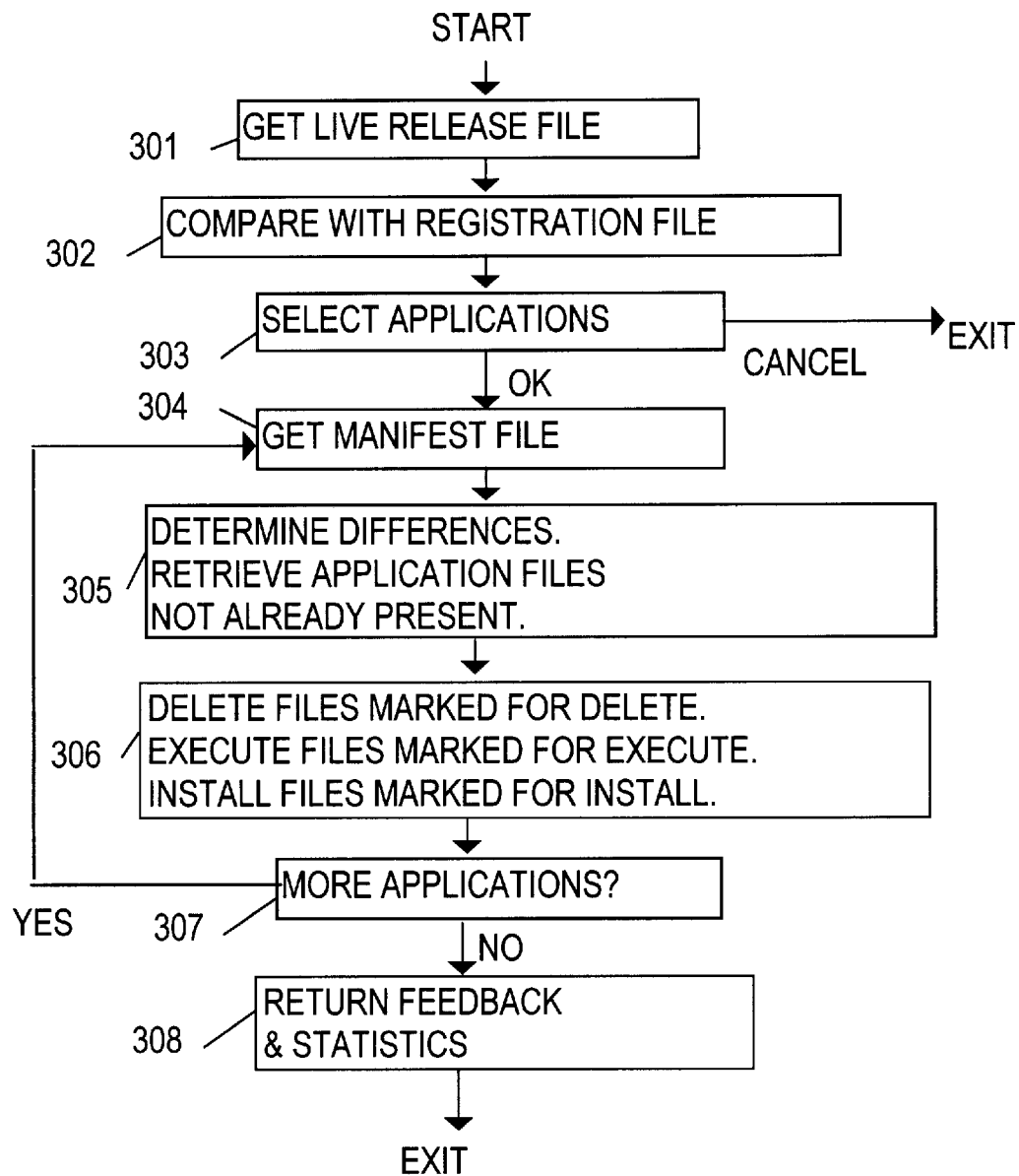
FIGS. 3A and 3B are flow charts of an update program.
Figure 3B:
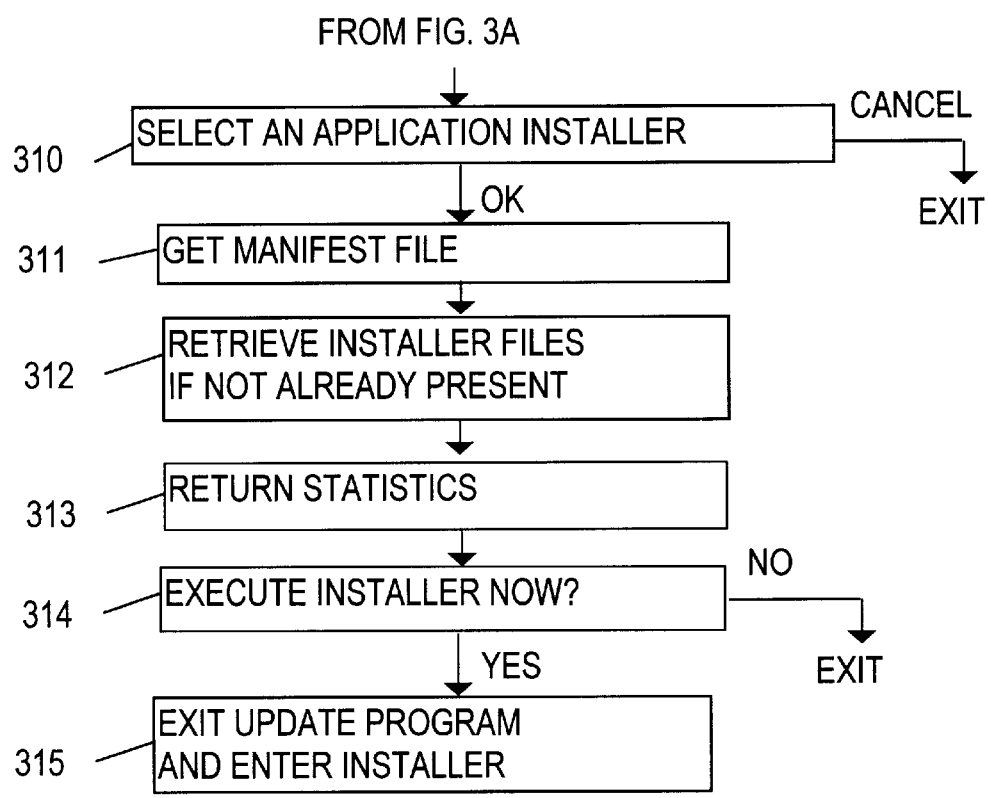

FIGS. 3A and 3B show the operation of the update program 110. This program can be run at any time on request by a user. Conveniently, it is a Microsoft Windows program.

(Step 301) Referring to FIG. 3A, the update program first contacts one of the servers 102, by way of the network 103, to obtain the live release file from that server.

(Step 302) The update program then compares this release file with its locally held registration file 109, to identify which of the currently installed applications have more recent versions available. It also identifies any new application installers in the release file for applications that are not installed locally on the client.

The update program then displays a screen, as shown in FIG. 9, which allows the user to select either an "Updates" option or a "New Release" option. If the user selects the "Updates" option, the update program proceeds to step 303 in FIG. 3A. Alternatively, if the user selects the "New Release" option, the update program proceeds to step 310 in FIG. 3B (see below).

(Step 303) If the user selects the "Updates" option, a list of the titles and versions of currently installed applications is displayed, as shown in FIG. 9. The display indicates which, if any, of the applications have more recent versions available. As an example, FIG. 9 shows that the installed application "Peripheral Products Binder [Jan. 10, 1996]" is up-to-date, while the installed application "Networking Binder [Jan. 9, 1996]" has a more recent version available. The user may select from this list one or more (or all) of the applications for which a more recent version is available. Selection of an application will automatically cause any dependent applications to be selected.

If there is a more recent version available of the update program itself, this is automatically selected. Hence, every time the update program runs it will update itself if necessary.

If the user selects the "OK" button on this screen, the program proceeds to Step 304 below. Alternatively, the user may simply exit from the program without performing any updates by selecting the "Cancel" button.

(Step 304) Assuming the "OK" button was selected in step 303, the update program contacts the server 102 to obtain the manifest file for the first (or only) of the selected applications.

(Step 305) The update program then determines differences between files installed on the client computer and those listed in the manifest file. For each application file listed in the manifest file, a check is made to determine whether the specified file is already present in the specified directory in the client by using CRC checks. If not, the program contacts the server 102, to retrieve the required application file. The retrieved file is expanded, and then checked for file-transfer corruption, using the CRC checksum. All the application files are read into a temporary directory on the client computer.

Thus, it can be seen that the update program does not fetch any application file if the required version of that file is already installed in the required directory, thereby eliminating unnecessary traffic over the network.

(Step 306) When all the files listed in the manifest file have been correctly retrieved, the installation actions are implemented as follows. Any files marked for deletion are deleted from the client computer, files marked for execution are executed and files marked for installation are installed into the specified directories in the client, provided the file version is more advanced than that of the existing file. Hence then any existing files with the same names in the directories will be overwritten.

If, on the other hand, some of the file transfers failed, none of the files are installed. Instead, a message is displayed, giving the user the option of either cancelling the update, or making another attempt to access the files.

(Step 307) If all the required applications have now been updated, the update program proceeds to Step 308. Otherwise it returns to Step 304 above to get the manifest file for the next required application to be updated.

(Step 308) Before exiting, the update program allows the user to return feedback (i.e. comments on the update program or the other applications the user is downloading and using) to a central server. The program also automatically returns statistics to the central server, showing who the user is and what has been downloaded. The central server maintains a table based on these statistics, allowing the system administrator to check whether each user is using the latest versions of the software applications.

Referring now to FIG. 3B, if the user selects the "New Release" option from the screen shown in FIG. 9, the update program proceeds as follows.

(Step 310) A list of newly released application installers, for applications not currently installed on this client, is displayed. The user may select only one of the application installers from this list.

If the user selects the "OK" button on this screen, the program proceeds to Step 311 below. Alternatively, the user may simply exit from the program without performing any updates by selecting the "Cancel" button.

(Step 311) If the "OK" button was selected in step 310, the update program contacts the server 102 to obtain the manifest file for the selected application installer.

(Step 312) A check is then made to determine whether the specified installer file is already present in the specified directory in the client by using CRC checks. If not, the program contacts the server 102, to retrieve the required installer file. The retrieved file is expanded, and then checked for file-transfer corruption, using the CRC checksum. The installer file is read into the temporary directory, and remains there for subsequent execution.

(Step 313) The update program returns statistics on the installation to the central server.

(Step 314) The update program then displays a message box, asking whether the user wishes to execute the installer now.

(Step 315) If the user selects "Yes" from this message box, the update program exits and enters the installer.

The update program logs its actions, so that in the event of a failure, such as a communications failure, it can restart from the point where the last file was correctly received.

It should be noted that the software update mechanism and the uploading mechanism described above do not require any special-purpose software resident on the servers. The servers run standard file server programs, and all the intelligence for the software update mechanism and the uploading mechanism resides solely in the update program and the uploader program.

Some Possible Modifications

It will be appreciated that many modifications may be made to the system described above without departing from the scope of the present invention. For example, the system may be adapted to different operating systems and transport protocols.

I claim:

1. A computer comprising a memory storing a plurality of software applications and storing a registration file, indicating which applications are currently installed in said memory and their version details, the computer also including a software update mechanism comprising:
   (a) means for accessing a remote file server to download from said remote file server to said computer a release file containing a list of software applications available from the remote server and their current version details;
   (b) means for comparing said release file with said registration file to determine which of the installed applications have upgrades available;
   (c) user interface means for allowing a user to select at least one of said applications for upgrading;
   (d) means for accessing the remote file server to download from said remote file server to said computer a manifest file containing details of the application files required to form an updated version of the selected application;
   (e) means for checking whether the application files listed in the manifest file are already available in the computer; and
   (f) means for accessing the remote file server to retrieve those application files that are not already available in the computer, and installing those files in the memory.

2. A computer according to claim 1 wherein said manifest file also includes details of application files required to be deleted in order to form the updated version of said selected application.

3. A computer according to claim 1 wherein said manifest file also includes details of application files required to be executed in order to form the updated version of said selected application.

4. A computer according to claim 1, wherein said release file includes at least one parameter specifying a linkage between a first application and a second application, and wherein said user interface means automatically selects said second application for upgrading whenever said first application is selected for upgrading.

5. A computer according to claim 1, wherein said software update mechanism comprises an update program, and wherein said user interface means automatically selects the update program for upgrading whenever one of said applications is selected for upgrading.

6. A computer according to claim 1 including means for using a checksum to check said application files when retrieved from said remote file server and for allowing the retrieved files to be installed only if the check is satisfactory.

7. A computer according to claim 1, further comprising:
   (g) means for comparing said release file with said registration file to identify available new installer versions of applications;
   (h) user interface means for allowing a user to select one of said installer versions;
   (i) means for accessing the remote file server to obtain a manifest file containing details of the installer files associated with said one of said installer versions;
   (j) means for using the manifest file to determine which of said installer files are already available in said memory means; and
   (k) means for retrieving those installer files that are not already available in said memory means from the remote file server, and executing those files.

8. A computer network comprising a plurality of server computers and a plurality of client computers, wherein each of the client computers comprises:
   (a) memory means for storing a plurality of software applications, and for storing a registration file, indicating which applications are currently installed in the memory means and their version details;
   (b) means for accessing one of said server computers to download from said server computer to said client computer a release file containing a list of software applications available from said server computer and their current version details;
   (c) means for comparing said release file with said registration file to determine which of the installed applications have upgrades available;
   (d) user interface means for allowing a user to select at least one of said applications for upgrading;
   (e) means for accessing said server computer to download from said server computer to said client computer a manifest file containing details of the application files required to form an updated version of the selected application;
   (f) means for checking whether the application files listed in the manifest file are already available in said memory means; and
   (g) means for accessing said server computer to retrieve those application files that are not already available in said memory means, and installing those files in said memory means.

9. A computer network according to claim 8 wherein at least one of said computers includes an uploader mechanism comprising:
   (h) means for accessing one of said server computers to obtain a manifest file containing details of the application files forming a current version of a particular application;
   (i) means for editing the manifest file to form a new manifest file for a new or updated application;
   (j) means for uploading the new manifest file, along with application files for the new or updated application, into one or more of the server computers.

10. A computer network according to claim 8 wherein at least one of said servers includes means for maintaining statistics on which applications have been downloaded by which users.

11. A method of updating software in a computer, the method comprising:
   (a) storing in said computer a registration file, indicating which applications are currently installed in the computer and their version details;
   (b) accessing a remote file server to download from said remote file server to said computer a release file containing a list of software applications available from the remote server and their current version details;

(c) comparing said release file with said registration file to determine which of the installed applications have upgrades available;

(d) allowing a user to select at least one of said applications for upgrading;

(e) accessing the remote file server to download from said remote file server to said computer a manifest file containing details of the application files required to form an updated version of the selected application;

(f) checking whether the application files listed in the manifest file are already available in the computer; and (g) accessing the remote file server to retrieve those application files that are not already available in the computer, and installing those files in the computer.

12. A method according to claim 11, including the further step of deleting further application files as specified in said manifest file.

13. A method according to claim 11, including the further step of executing further application files as specified in said manifest file.

14. A method according to claim 11, wherein said release file includes at least one parameter specifying a linkage between a first application and a second application, and including the further step of automatically selecting said second application for upgrading whenever said first application is selected for upgrading.

15. A method according to claim 11, including the further step of automatically selecting an update program for upgrading whenever one of said applications is selected for upgrading.

16. A method according to claim 11 including the further step of using a checksum to check said application files when retrieved from said remote file server, and allowing the retrieved files to be installed only if the check is satisfactory.

17. A method according to claim 11, including the further steps:

(h) comparing said release file with said registration file to identify available new installer versions of applications;

(i) allowing a user to select one of said installer versions;

(j) accessing the remote file server to download from said remote file server to said computer a manifest file containing details of the installer files associated with said one of said installer versions;

(k) using the manifest file to determine which of said installer files are already available in said memory means; and (l) downloading those installer files that are not already available in said memory means from the remote file server to said computer, and executing those files in said computer.

18. A method of updating software in a computer, the method comprising:

(a) storing a registration file, indicating which applications are currently installed in the computer and their version details;

(b) accessing a remote file server to obtain a release file containing a list of software applications available from the remote server and their current version details, said release file including at least one parameter specifying a linkage between a first application and a second application;

(c) comparing said release file with said registration file to determine which of the installed applications have upgrades available;

(d) allowing a user to select at least one of said applications for upgrading;

(e) accessing the remote file server to obtain a manifest file containing details of the application files required to form an updated version of the selected application;

(f) using the manifest file to determine which of the required application files are already available in the computer;

(g) accessing the remote file server to retrieve those application files that are not already available in the computer, and installing those files in the computer; and (h) automatically selecting said second application for upgrading whenever said first application is selected for upgrading.

19. A method of updating software in a computer, the method comprising running an update program to perform the steps:

(a) accessing a remote file server to obtain a release file containing a list of software applications available from the remote server and their current version details;

(b) comparing said release file with a registration file, indicating which applications are currently installed in the computer and their version details, to determine which of the installed applications have upgrades available;

(c) allowing a user to select at least one of said applications for upgrading;

(d) accessing the remote file server to obtain a manifest file containing details of the application files required to form an updated version of the selected application;

(e) using the manifest file to determine which of the required application files are already available in the computer; and (f) accessing the remote file server to retrieve those application files that are not already available in the computer, and installing those files in the computer;

(g) wherein the update program is automatically selected for upgrading whenever one of said applications is selected for upgrading.

20. A method of updating software in a computer, the method comprising:

(a) storing a registration file, indicating which applications are currently installed in the computer and their version details;

(b) accessing a remote file server to obtain a release file containing a list of software applications available from the remote server and their current version details;

(c) comparing said release file with said registration file to identify available new installer versions of applications;

(d) allowing a user to select one of said installer versions;

(e) accessing the remote file server to obtain a manifest file containing details of the installer files associated with said one of said installer versions;

(f) using the manifest file to determine which of said installer files are already available in said memory means; and (g) retrieving those installer files that are not already available in said memory means from the remote file server, and executing those files.

* * * * *